United States Patent [19]

Wilson et al.

[11] Patent Number: 4,614,658
[45] Date of Patent: Sep. 30, 1986

[54] FILLED SUGAR CANDIES AND A METHOD OF REMELTING AND REMOLDING SUCH CANDIES TO PRODUCE HOME MADE MOLDED HARD SUGAR CANDIES

[75] Inventors: James E. Wilson, Glen Ellyn; Alexander J. Chalmers, Mount Prospect, both of Ill.

[73] Assignee: Peerless Confection Company, Chicago, Ill.

[21] Appl. No.: 704,640

[22] Filed: Feb. 22, 1985

[51] Int. Cl.⁴ .............................................. A23G 3/00
[52] U.S. Cl. .................................... 426/103; 426/660; 426/658
[58] Field of Search .............. 426/660, 512, 515, 103, 426/658

[56] References Cited

U.S. PATENT DOCUMENTS

| | | | |
|---|---|---|---|
| 3,826,857 | 7/1974 | Horn | 426/660 |
| 3,958,024 | 5/1976 | Fissolo | 426/660 |
| 3,962,473 | 6/1976 | Lilov | 426/660 |
| 4,158,064 | 6/1979 | Banowitz | 426/660 |
| 4,229,482 | 10/1980 | Kreske, Jr. | 426/660 |
| 4,260,596 | 4/1981 | Mackles | 426/660 |
| 4,344,972 | 8/1982 | Wienecke | 426/660 |
| 4,372,942 | 2/1983 | Cimiluca | 426/660 |
| 4,517,205 | 5/1985 | Aldrich | 426/660 |

*Primary Examiner*—Jeanette Hunter
*Attorney, Agent, or Firm*—Burmeister, York, Palmatier, Hamby & Jones

[57] ABSTRACT

A filled sugar candy made with a hard sugar candy outer shell encasing a center filling made of a viscous liquid sugar syrup. The hard sugar candy outer shell consists essentially of sugar materials with a low moisture content, less than approximately two percent by weight, and with essentially no acid content. The center filling syrup consists of a moisture content ranging from 19 to 23 percent by weight, the remainder consisting of sugars with essentially no acid content. The center filling syrup ranges from 13 to 16 percent by weight of the filled sugar candy, the remainder being the hard sugar candy outer shell.

In a home kitchen, the filled sugar candy is melted by applying heat and agitation thereto to produce a hot viscous syrupy product which homogeneously combines the hard sugar candy outer shell and the center filling. The melted syrupy product is poured into molds and is allowed to cool, whereby the poured product becomes molded hard sugar candies. The presence of the center filling syrup in the filled sugar candy greatly facilitates the melting and pouring steps, with the use of a low heat for melting, and with no significant darkening or discoloration of the finished candies.

12 Claims, 4 Drawing Figures

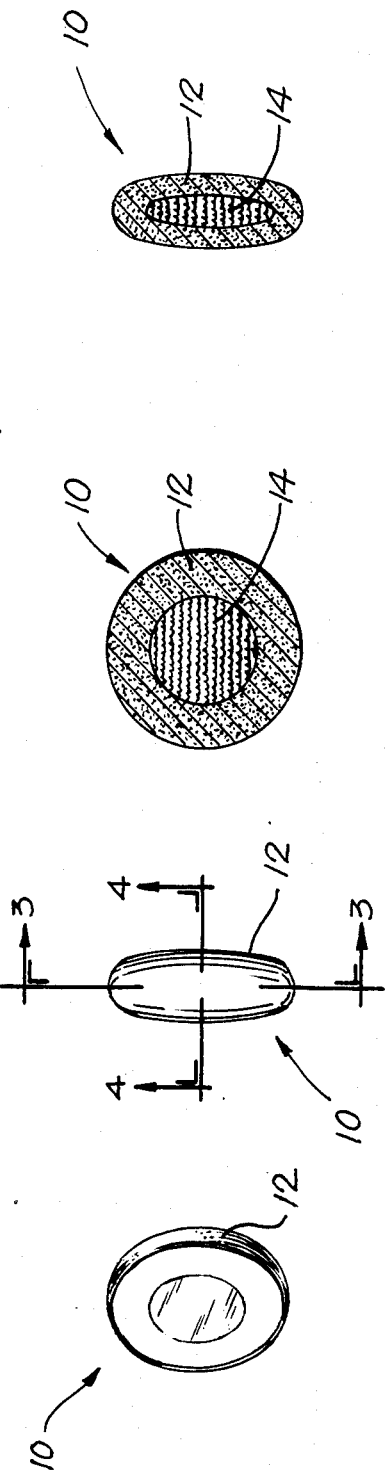

FILLED SUGAR CANDIES AND A METHOD OF REMELTING AND REMOLDING SUCH CANDIES TO PRODUCE HOME MADE MOLDED HARD SUGAR CANDIES

FIELD OF THE INVENTION

This invention relates to a method of producing home made remelted and remolded hard sugar candies. The invention also relates to new and improved filled sugar candies for use in such method.

BACKGROUND OF THE INVENTION

It has been the practice of some home confectionery cooks to remelt hard sugar candies and to pour the melted material into candy molds, which are then allowed to cool, to produce molded hard sugar candies, which may have a shape appropriate for various holiday seasons, such as Thanksgiving, Christmas and Valentine's Day. Such home molded sugar candies are also widely used for cake decorations.

Certain hard sugar candies have been specifically made and commercially sold for remelting and remolding in home kitchens, to produce molded hard sugar candies. However, problems have been experienced with such commercially sold hard sugar candies, in that it has been difficult to remelt such candies. Excessive heat has been required to remelt such candies, whether the candies have been remelted in a hot conventional oven, on a stove top burner in a kettle, or in a microwave oven. The excessive heat has caused objectionable darkening and discoloration of the candies. Moreover, the melted candy material has been so viscous as to be difficult to pour into candy molds. These problems have been discouraging to home confectionery cooks, wishing to make their own molded hard sugar candies.

SUMMARY OF THE INVENTION

One object of the present invention is to provide a new and improved method to overcome the problems heretofore encountered in remelting and remolding sugar candies to produce molded hard sugar candies in home kitchens.

A further object is to provide new and improved sugar candies which melt more easily, with less heat, and without significant discoloration, to provide a melted product which can be poured more easily into candy molds.

To achieve these objects, the present invention provides a method of making molded hard sugar candies intended specifically for completion in home kitchens, comprising the steps of making filled sugar candy pieces, each of such pieces being made with a hard sugar candy outer shell encasing a center filling made of a viscous liquid sugar syrup, melting such filled sugar candy pieces by applying heat and agitation thereto to produce a hot viscous syrupy product which homogeneously combines the hard sugar candy outer shell and the center filling, pouring such hot viscous syrupy product into molds, and causing the poured product and the molds to cool, whereby the poured product becomes molded hard sugar candies.

The center filling syrup provides additional moisture which greatly facilitates the remelting of the filled sugar candy pieces, at a low heat, and with no significant discoloration. The melted product is sufficiently low in viscosity to be easy to pour into candy molds.

The center filling preferably has a moisture content of approximately 21 percent by weight, but the moisture content may range from 19 to 23 percent.

The center filling syrup consists essentially of sugars with the above mentioned moisture content, but with essentially no acid content. The sugars are preferably derived from sucrose, invert sugars and corn syrup.

The hard sugar candy outer shell preferably consists of sugar materials with a low moisture content, less than approximately two percent by weight, and with essentially no acid content.

Citric acid is widely used in hard sugar candy, but the remeltable filled sugar candy of the present invention should not have any significant acid content, because any significant acid content causes the candy material to darken and discolor when the candy material is supplied with enough heat to remelt the material.

Such darkening and discoloration are very objectionable.

The present invention also provides a filled sugar candy adapted specifically to be melted in home kitchens and poured into candy molds for use in producing homogeneous home molded hard sugar candies, such filled sugar candy consisting of a hard sugar candy outer shell, and a center filling encased within the shell and consisting of a viscous liquid sugar syrup, such syrup consisting of a moisture content ranging from 19 to 23 percent by weight, the remainder of such syrup consisting of sugars, with essentially no acid content, such hard sugar candy outer shell consisting essentially of sugar materials with a low moisture content less than approximately two percent by weight and with essentially no acid content.

Preferably, the sugars of the center filling syrup are essentially derived entirely from sucrose, invert sugars and corn syrup.

Preferably, the center filling is in the range of 13 to 16 percent by weight of the filled sugar candy, the remainder consisting essentially of the hard sugar candy outer shell.

BRIEF DESCRIPTION OF THE DRAWINGS

Further objects, advantages and features of the present invention will appear from the following description, taken with the accompanying drawings, in which:

FIG. 1 is a perspective view of a filled sugar candy, to be described as an illustrative embodiment of the present invention.

FIG. 2 is an elevational view of such filled sugar candy.

FIG. 3 is a sectional view, taken generally along the line 3—3 in FIG. 2.

FIG. 4 is a sectional view, taken generally along the line 4—4 in FIG. 2.

DETAILED DESCRIPTION OF ILLUSTRATIVE EMBODIMENTS

As just indicated, the drawings illustrate a filled sugar candy 10 adapted specifically to be melted in home kitchens and poured into candy molds for use in producing homogeneous home molded hard sugar candies. The drawings illustrate a single piece of the filled sugar candy 10. Like other filled sugar candies, the candy 10 can be made in large quantities at a high production rate by sugar candy making machines, which are well known to those skilled in the art.

The illustrated filled sugar candy 10 consists of a hard sugar candy outer shell 12, and a center filling 14, encased within the outer shell 12. It will be understood that the filled sugar candy 10 is shown diagrammatically in the drawings, and that the configuration of the candy 10, the outer shell 12, and the center filling 14 may vary widely. Thus, those skilled in the art are able to make filled sugar candy in a wide variety of sizes and shapes, by using different molds and different machines, for example. Moreover, the center filling may be varied widely in size and shape.

The hard sugar candy outer shell 12 consists of sugar materials with a low moisture content, less than two percent by weight, and with essentially no acid content. The sugar materials are preferably derived entirely from sucrose and corn syrup.

Citric acid is widely used in hard sugar candies, but the hard sugar candy outer shell 12 of the filled sugar candy 10 should not include any significant acid content, and preferably should be entirely free of any acid content, because the presence of any significant acid content has the effect of darkening and discoloring the candy when it is heated sufficiently to remelt the candy. The acid has this effect, when heat is applied, because the acid causes the breakdown of some of the sucrose by hydrolysis into dextrose and levulose, which are subject to darkening and discoloration by the heat which is necessary to remelt the candy.

The center filling 14 consists of a viscous liquid sugar syrup, which, in turn, consists of a moisture content ranging from 19 to 23 percent by weight, the remainder of such syrup consisting of sugars, with essentially no acid content. Preferably, the moisture content should be approximately 21 percent by weight. It is preferable that the sugars of such syrup be essentially derived entirely from sucrose, invert sugars and corn syrup.

The invert sugars may be made by producing a syrupy solution of sucrose dissolved in water, and adding the minimum amount of acid, preferably citric acid, to cause hydrolysis of the sucrose into invert sugars, including dextrose and levulose. Only the minimum possible amount of citric acid should be used, so that there is essentially no acid content in the invert sugar syrup. For example, only three pounds of citric acid need to be used in a batch of syrup containing thirteen hundred pounds of sucrose. While this small amount of citric acid is not considered significant, it is highly desirable to test the invert sugar syrup for acidity and to neutralize any acidity by adding a suitable neutralizer, preferably finely ground calcium carbonate, in an amount sufficient to bring the pH of the invert sugar syrup to a neutral value of 7.0.

The center filling syrup 14 of the filled sugar candy 10 preferably ranges from 13 to 16 percent by weight of the filled sugar candy, the remainder being the hard sugar candy outer shell 12.

In the method of the present invention, the filled sugar candy 10 is made, preferably in large quantities, by a candy factory. A batch, containing one or more of the filled sugar candies 10, is then melted by the application of heat and agitation, to produce a hot viscous syrupy product which homogeneously combines the hard sugar candy outer shell 12 and the center filling syrup 14. The hot viscous syrupy product is then poured into molds, such as plastic or metal candy molds. The poured product and the molds are then caused to cool, whereby the poured product becomes molded hard sugar candies which are homogeneous. The melting, pouring and molding steps are typically performed in a home kitchen by a home confectionery cook. The molded candies are often molded in shapes which are appropriate for holiday seasons, such as Thanksgiving, Christmas and Valentine's Day. Moreover, the molded candies are often used as cake decorations for birthday cakes and other cakes for special observances.

In the method of the present invention, the presence of the center filling syrup 14 greatly facilitates the melting of the filled sugar candy 10, so that the melting can be accomplished with low heat, so that there is no significant darkening or discoloration of the melted product. The filled sugar candy 10 can be melted in a hot oven; over a stove burner, in a suitable pan or kettle; or in a microwave oven, with the candy in a suitable container. A microwave oven is particularly effective because of the high moisture content of the center filling syrup 14.

The melted syrupy product is preferably stirred or otherwise agitated sufficiently to make it entirely homogeneous. It is easy to pour the melted syrupy product into candy molds, because the viscosity of the melted syrupy product is reduced by the moisture derived from the center filling syrup 14.

EXAMPLES

The examples presented herein will illustrate the best mode presently contemplated of practicing the invention.

To produce the filled sugar candy of the present invention, several sugar candy batches were made, for use in producing the hard sugar candy outer shells. These sugar candy batches were produced in accordance with previously used procedures and recipes, but with no acid content.

The sugar candy batches were produced by precooking a sucrose syrup, consisting of sucrose dissolved in water, in an automatic precooking machine, known as a Solvomat machine. To reduce the water content, the precooking was continued to reach a boiling temperature of 230° F. The sucrose syrup was then mixed with corn syrup to produce a sucrose-corn syrup mixture consisting of approximately 50% corn syrup and 50% sucrose syrup. The precooking machine was used for automatically proportioning the desired mixture of corn syrup and sucrose syrup.

The syrup mixture was transferred to a vacuum cooker, which reduced the water content to produce a water content of approximately 1.5–2.0% in the finished hard candy of the outer shells. Small amounts of food coloring and flavoring materials may be added.

The sugar candy material was removed from the vacuum cooker in the form of a hot viscous mass, which was cooled to a somewhat lower temperature, to achieve a viscosity suitable for processing in a candy making machine.

The center filling syrup for the filled sugar candy was prepared by mixing the sucrose-corn syrup mixture from the automatic precooking machine with a hot syrup consisting of a mixture of invert sugar syrup and corn syrup. The center filling syrup was proportioned as shown in the following table:

TABLE 1

| CENTER FILLING SYRUP - CALCULATED ANALYSIS | | | | | | | |
|---|---|---|---|---|---|---|---|
| | | SOLIDS | | WATER | | REDUCING SUGARS | |
| CONSTIT-UENTS | WEIGHT | % | LBS | % | LBS | % | LBS |
| Sucrose- | 50 LBS | 77.4 | 38.7 | 22.6 | 11.3 | 19.6 | 7.58 |

TABLE 1-continued

| CENTER FILLING SYRUP - CALCULATED ANALYSIS | | | | | | | |
|---|---|---|---|---|---|---|---|
| CONSTIT- | | SOLIDS | | WATER | | REDUCING SUGARS | |
| UENTS | WEIGHT | % | LBS | % | LBS | % | LBS |
| corn syrup mixture | | | | | | | |
| Invert sugar- Corn syrup mixture | 50 LBS | 81.0 | 40.5 | 19.0 | 9.5 | 62.6 | 25.35 |
| TOTALS | 100 LBS | 79.2 | 79.2 | 20.8 | 20.8 | 41.6 | 32.93 |

The moisture content of the center filling syrup was 20.8%, or approximately 21%.

Filled sugar candies were made with various flavors, including cherry, lemon, orange, lime and root beer. The outer shell was flavored and colored, while the center filling syrup was left unflavored and uncolored.

The following table shows the proportioning of a cherry flavored filled sugar candy batch:

TABLE 2

| FILLED SUGAR CANDY, CHERRY FLAVORED - CALCULATED ANALYSIS | | | | | | | |
|---|---|---|---|---|---|---|---|
| CONSTIT- | | SOLIDS | | WATER | | REDUCING SUGARS | |
| UENTS | WEIGHT | % | LBS | % | LBS | % | LBS |
| Sugar candy batch for outer shell | 150 LBS | 98.5 | 147.75 | 1.5 | 2.25 | 20.0 | 29.55 |
| Center filling syrup | 25 LBS | 79.2 | 19.8 | 20.8 | 5.20 | 32.93 | 6.52 |
| Checker red coloring | 2 FL OZ | | | | | | |
| Cherry flavoring | 4 FL OZ | | | | | | |
| TOTALS | 175.375 LBS | 95.53 | 167.55 | 4.25 | 7.45 | 20.56 | 36.07 |

In the candy making machine, the hot viscous sugar candy mass was worked into a generally conical shape, and then was extruded and drawn into a hollow tubular form, commonly known as a candy rope. The center filling syrup was extruded into the hollow center of the candy rope by an extrusion pipe, centrally located within the conical sugar candy batch.

In the candy making machine, the travelling candy rope was rapidly pinched off into small pieces of the desired size, which were then rapidly molded into the desired shape by automatic dies. The finished candy pieces are then cooled.

The pinching and molding operations have the effect of sealing the center filling syrup within the hard sugar candy outer shell.

The invert sugar syrup for use in the filling mixture was made by dissolving sucrose in water to produce a sucrose syrup, and by adding a small amount of acid, preferably citric acid, to cause some or all of the sucrose molecules to split into dextrose and levulose. The amount of acid should be minimized. In practice, only three pounds of citric acid was used in a batch of syrup containing 1300 lbs. of sucrose, dry weight.

Preferably, the acid should be neutralized to bring the pH of the invert sugar syrup to a neutral value of 7.0. In practice, this was accomplished by adding finely ground calcium carbonate to the invert sugar syrup, in an amount sufficient to neutralize the citric acid.

Several batches of the filled sugar candies were made, differing only in the flavor and color of the hard sugar candy employed in the outer shell. The flavors employed were cherry, lemon, orange, lime and root beer. The following table shows the proportioning of the coloring and flavoring materials in the sugar candy batches for the outer shells.

TABLE 3

| COLOR | AMOUNT FL. OZ. | FLAVOR | A- MOUNT FL. OZ. | SUGAR BATCH REGULAR |
|---|---|---|---|---|
| CHECKER RED | 2 | CHERRY | 4 | 150 |
| YELLOW | 2 | LEMON | 5 | 150 |
| ORANGE | 2 | ORANGE | 7 | 150 |
| GREEN | 1½ | LIME | 4 | 150 |
| ROOT BEER | 2½ | ROOT BEER | 4 | 150 |

MOISTURE CONTENT - LESS THAN 2%
DEXTROSE EQUIVALENT - 17-20%

In Tables 1 and 2, the reducing sugars are listed by weight and by percentage of the total solids. The percentage of reducing sugars affects the shelf life of the filled sugar candies. Thus, the shelf life can be increased by lowering the percentage of reducing sugars. From this standpoint, it would be better to increase the percentage of sucrose syrup in the jacket material from 50% to 60%, while decreasing the percentage of the corn syrup from 50% to 40%.

In the examples referred to in Tables 1 and 2, the invert-corn syrup mixture contained approximately 50% invert sugar syrup and 50% corn syrup. This proportioning can be varied rather widely, so that the proportion of corn syrup will range between one-third and two-thirds by weight, the remainder being invert sugar syrup, which will correspondingly range between two-thirds and one-third of the mixture, by weight. Changing the proportions of the two constituents changes the viscosity and chewiness of the filling syrup for the filled sugar candy. Increasing the proportion of invert sugar syrup tends to make the filling material less viscous and less chewy. Increasing the proportion of the corn syrup tends to make the filling material more viscous and more chewy.

The moisture content of the filling material should be maintained in the range from 19–23%, preferably about 21%.

It has been found that the filled sugar candies of the present invention can easily be melted by applying low heat with stirring or other agitation. This can be done simply by placing any desired number of the filled candy pieces in a pan or kettle, and applying heat to the pan by placing it over a gas burner or an electric heating element at low heat. When enough heat has been supplied to the pan to start melting the filled candies, agitation is supplied to the candies, preferably by stirring, so as to accelerate the melting process, while also homogeneously combining and mixing the materials of the hard outer shell and the syrupy filling. It has been found that the filled sugar candies of the present invention can readily be completely melted and homogeneously mixed, without any appreciable darkening or discoloration of the melted material. Moreover, the melted material can readily be poured into candy molds. The melted material and the candy molds are then allowed to cool, so that the melted material solidifies, thereby becoming hard molded sugar candies. The amount of heat employed is so low that the molded sugar candies do not show any appreciable discoloration or darkening.

The melting of the filled sugar candies of the present invention is much easier and requires much less heat, than was required to remelt the hard sugar candies previously used for producing remelted and remolded sugar candies. The present invention substantially eliminates the darkening and discoloration of the remolded candies experienced with the use of previous methods, due to the high heat which was necessary to remelt the hard sugar candies.

The present invention also makes it much easier to pour the remelted material into candy molds, due to the higher moisture content supplied by the filling syrup in the filled sugar candies of the present invention. The higher moisture content reduces the viscosity of the melted material.

The filled sugar candies of the present invention can also be melted very easily by heating them in a conventional heating oven or a microwave oven, with the filled sugar candies in a suitable container. As melting occurs, the material is stirred or otherwise agitated, so that the materials derived from the hard outer shell and the syrupy filling are homogeneously mixed and combined.

A microwave oven is especially well adapted for remelting the filled sugar candies of the present invention, because of the high moisture content of the filling syrup, and because the microwave oven makes it easy to control and minimize the amount of heat employed to remelt the filled sugar candies.

The remelted and remolded hard sugar candies, resulting from the method of the present invention, have an excellent appearance and are very flavorful and enjoyable. The same is true of the filled sugar candies, prior to remelting, so that the filled sugar candies can be eaten very enjoyably, without being remelted and remolded, if desired.

We claim:

1. A filled sugar candy adapted specifically to be melted in home kitchens and poured into candy molds for use in producing homogeneous home molded hard sugar candies,
   such filled sugar candy consisting of a hard sugar candy outer shell,
   and a center filling encased directly within the outer shell and consisting of a viscous liquid sugar syrup,
   such syrup consisting of a water content ranging from 19 to 23 percent by weight,
   the remainder of such syrup consisting essentially of sugars, with essentially no acid content,
   such hard sugar candy outer shell consisting essentially of sugars and a low water content less than approximately two percent by weight and with essentially no acid content.

2. A filled sugar candy according to claim 1,
   in which the sugars of such viscous liquid sugar syrup are essentially derived entirely from sucrose, invert sugars and corn syrup.

3. A filled sugar candy according to claim 1,
   in which the center filling is in the range of 13 to 16 percent by weight of the entire filled sugar candy,
   the remainder consisting essentially of the hard sugar candy outer shell.

4. A filled sugar candy adapted specifically to be melted in home kitchens and poured into candy molds for use in producing homogeneous home molded hard sugar candies,
   such filled sugar candy consisting of a hard sugar candy outer shell,
   and a center filling encased directly within such shell and consisting of a viscous liquid sugar syrup consisting essentially of sugars and a water content of substantially 21 percent by weight and with essentially no acid content,
   the hard sugar candy outer shell consisting essentially of sugars and a low water content less than approximately two percent by weight and with essentially no acid content,
   the center filling of the entire filled sugar candy being in the range from 13 to 16 percent by weight thereof,
   the remainder being the hard sugar candy outer shell.

5. A filled sugar candy according to claim 4,
   in which the sugars of the center filling are derived essentially entirely from sucrose, invert sugars and corn syrup.

6. A filled sugar candy adapted specifically to be melted in home kitchens and poured into candy molds for use in producing homogeneous home molded hard sugar candies,
   such filled sugar candy consisting of a hard sugar candy outer shell,
   and a center filling encased directly within the outer shell and consisting of a viscous liquid sugar syrup,
   such syrup consisting of a water content of substantially 21 percent by weight,
   the remainder of such syrup consisting essentially of sugars,
   with essentially no acid content,
   such hard sugar candy outer shell consisting essentially of sugars and a low water content less than approximately two percent by weight and with essentially no acid content.

7. A method of making molded hard sugar candies intended specifically for completion in home kitchens, comprising the steps of
   molding filled sugar candy pieces each consisting of a hard sugar candy outer shell and a center filling encased directly within the outer shell and consisting of a viscous liquid sugar syrup,
   said syrup consisting of a water content ranging from 19 to 23 percent by weight and the remainder of said syrup consisting essentially of sugars with essentially no acid content,
   said hard sugar candy outer shell consisting essentially of sugars and a low water content less than approximately two percent by weight and with essentially no acid content,
   melting said filled sugar candy pieces by applying low heat and agitation thereto to produce a hot viscous syrupy product which homogeneously combines the hard sugar candy outer shell and the center filling,
   the center filling in each of the pieces being operative to facilitate the melting step with low heat to avoid any substantial discoloration of said syrupy product while also reducing the viscosity thereof to facilitate pouring of the product,
   pouring said hot viscous syrupy product into molds,
   and causing the poured product and the molds to cool,
   whereby the poured product becomes molded hard sugar candies without any substantial discoloration.

8. A method according to claim 7, in which said sugars of said center filling consist essentially of sugars derived from sucrose, invert sugars and corn syrup.

9. A method according to claim 7,
in which said center filling is in the range of 13 to 16 percent by weight of each of the filled sugar candy pieces,
the remainder of each of said pieces consisting essentially of the hard sugar candy outer shell.

10. A method of making molded hard sugar candies intended specifically for completion in home kitchens, comprising the steps of
molding filled sugar candy pieces each consisting of a hard sugar candy outer shell and a center filling encased directly within the outer shell and consisting of a viscous liquid sugar syrup,
said syrup consisting of a water content of substantially 21 percent by weight and the remainder of said syrup consisting essentially of sugars with essentially no acid content,
said hard sugar candy outer shell consisting essentially of sugars and a low water content less than approximately two percent by weight and with essentially no acid content,
melting said filled sugar candy pieces by applying low heat and agitation thereto to produce a hot viscous syrupy product which homogeneously combines the hard sugar candy outer shell and the center filling,
the center filling in each of the pieces being operative to facilitate the melting step with low heat to avoid any substantial discoloration of said syrupy product while also reducing the viscosity thereof to facilitate pouring of the product,
pouring said hot viscous syrupy product into molds,
and causing the poured product and the molds to cool,
whereby the poured product becomes molded hard sugar candies without any substantial discoloration.

11. A method according to claim 10,
in which said center filling is in the range of 13 to 16 percent by weight of each of the filled sugar candy pieces and the remainder of each of the pieces consisting essentially of said hard sugar candy outer shell.

12. A method according to claim 11,
in which the sugars of the center filling consist essentially of sugars derived from sucrose, invert sugars and corn syrup.

* * * * *